United States Patent [19]

Cope

[11] Patent Number: 4,601,093
[45] Date of Patent: Jul. 22, 1986

[54] WIRE INSULATION STRIPPING APPARATUS

[75] Inventor: Richard L. Cope, Glendora, Calif.

[73] Assignee: Eubanks Engineering Co., Monrovia, Calif.

[21] Appl. No.: 652,958

[22] Filed: Sep. 21, 1984

[51] Int. Cl.⁴ .............................................. H02G 1/12
[52] U.S. Cl. ..................................... 29/564.4; 81/9.51
[58] Field of Search ............. 81/9.51; 29/564.1, 564.4, 29/566.2, 566.3, 33 M

[56] References Cited

U.S. PATENT DOCUMENTS 3,326,622  4/1968  Sitz ..................... 81/9.51 X
3,479,718  11/1969 Van De Kerkhof et al. ... 81/9.51 X
3,951,016  4/1976  Gudmestad et al. ........... 81/9.51
4,327,609  5/1982  Resch ........................... 81/9.51

FOREIGN PATENT DOCUMENTS 2927235  8/1980  Fed. Rep. of Germany ....... 81/9.51

Primary Examiner—Gil Weidenfeld
Assistant Examiner—Glenn L. Webb
Attorney, Agent, or Firm—William W. Haefliger

[57] ABSTRACT

Wire stripping apparatus for automatically stripping insulation off a wire core, comprises:
(a) a guide forming at least one opening to receive an insulated wire end,
(b) at least one wire end sensor for sensing a wire end inserted through that opening, or a selected opening of a group,
(c) wire end clamping structure operable in response to said sensing to clamp the insulated wire inserted through said opening,
(d) cutter structure operable in response to said sensing to sever a predetermined length of insulation on the insulated wire end inserted through the opening,
(e) and carriage structure carrying the sensor and the cutter structure to retract same relatively away from said clamp structure after it has clamped the wire end and after the cutter structure has severed the insulation, thereby to pull a selected length of insulation off the wire core.

15 Claims, 28 Drawing Figures

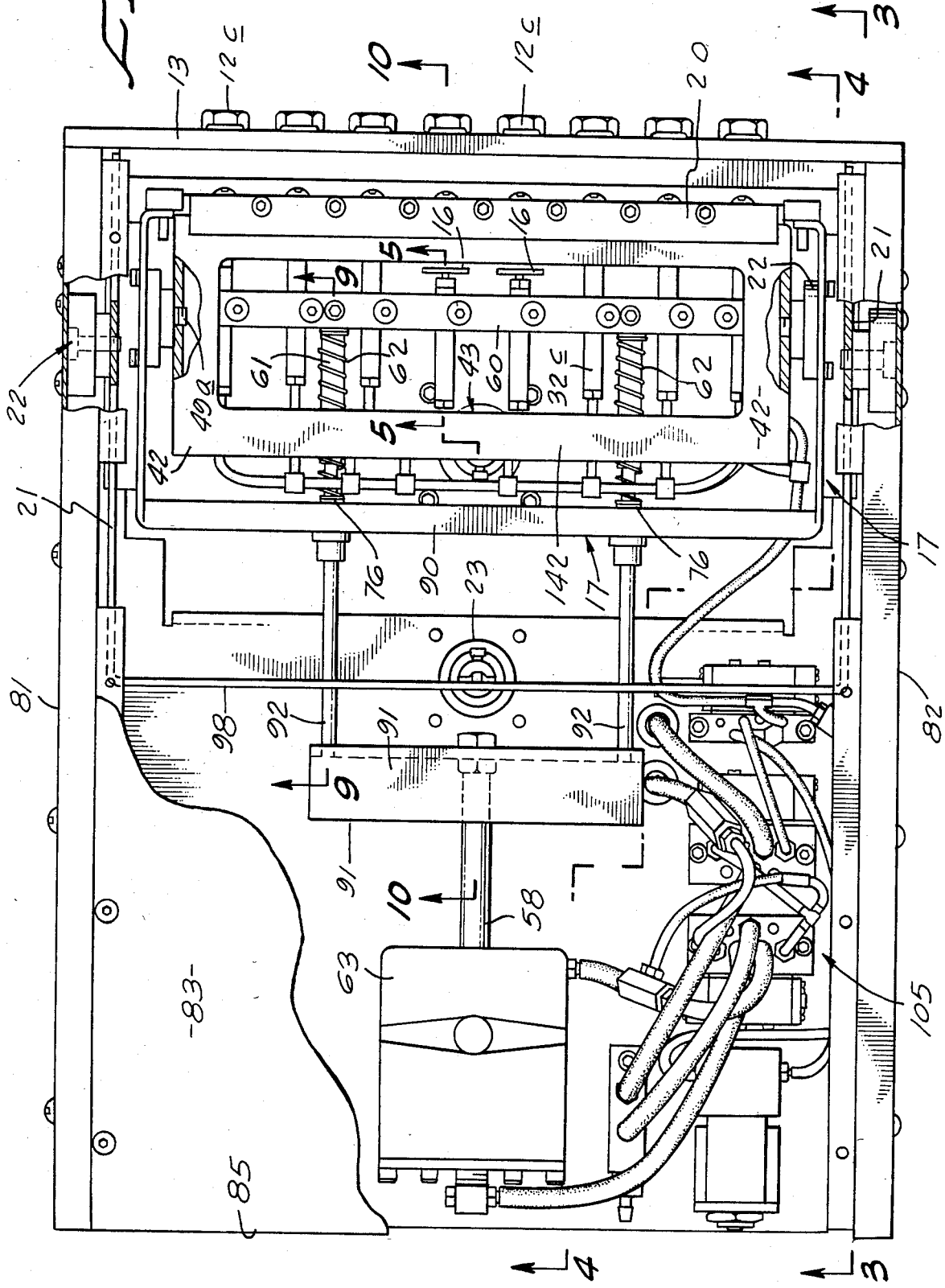

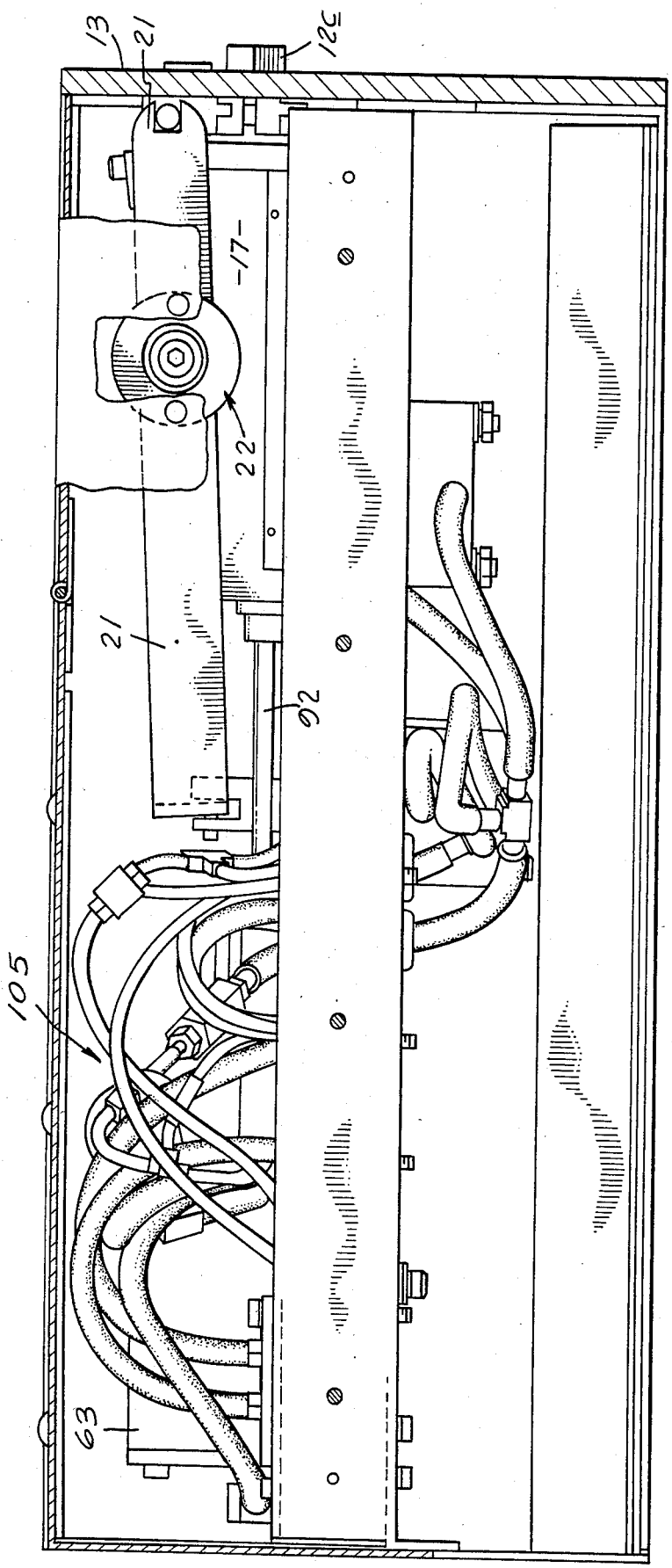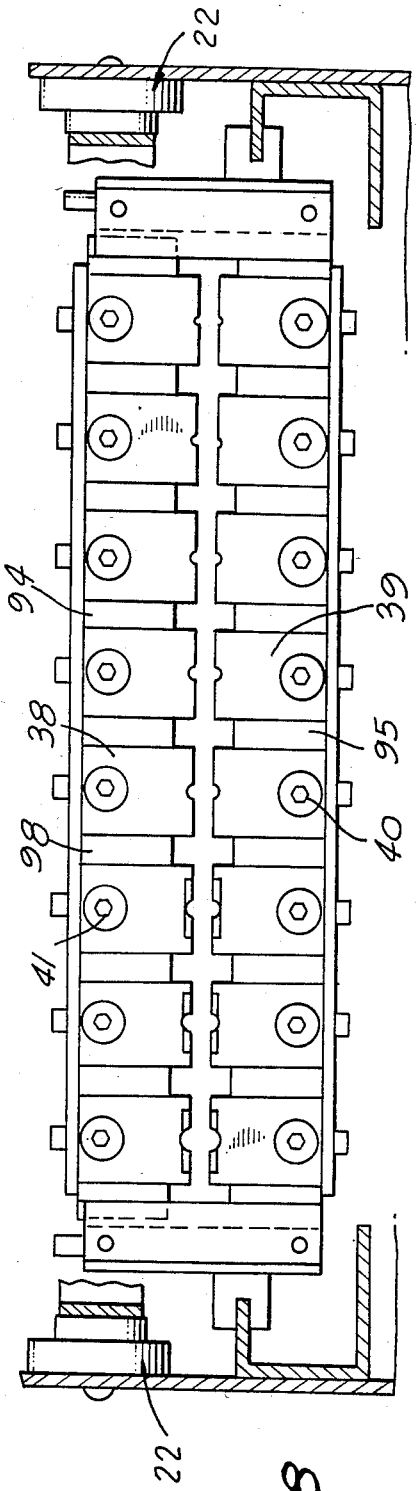
FIG. 3
FIG. 8

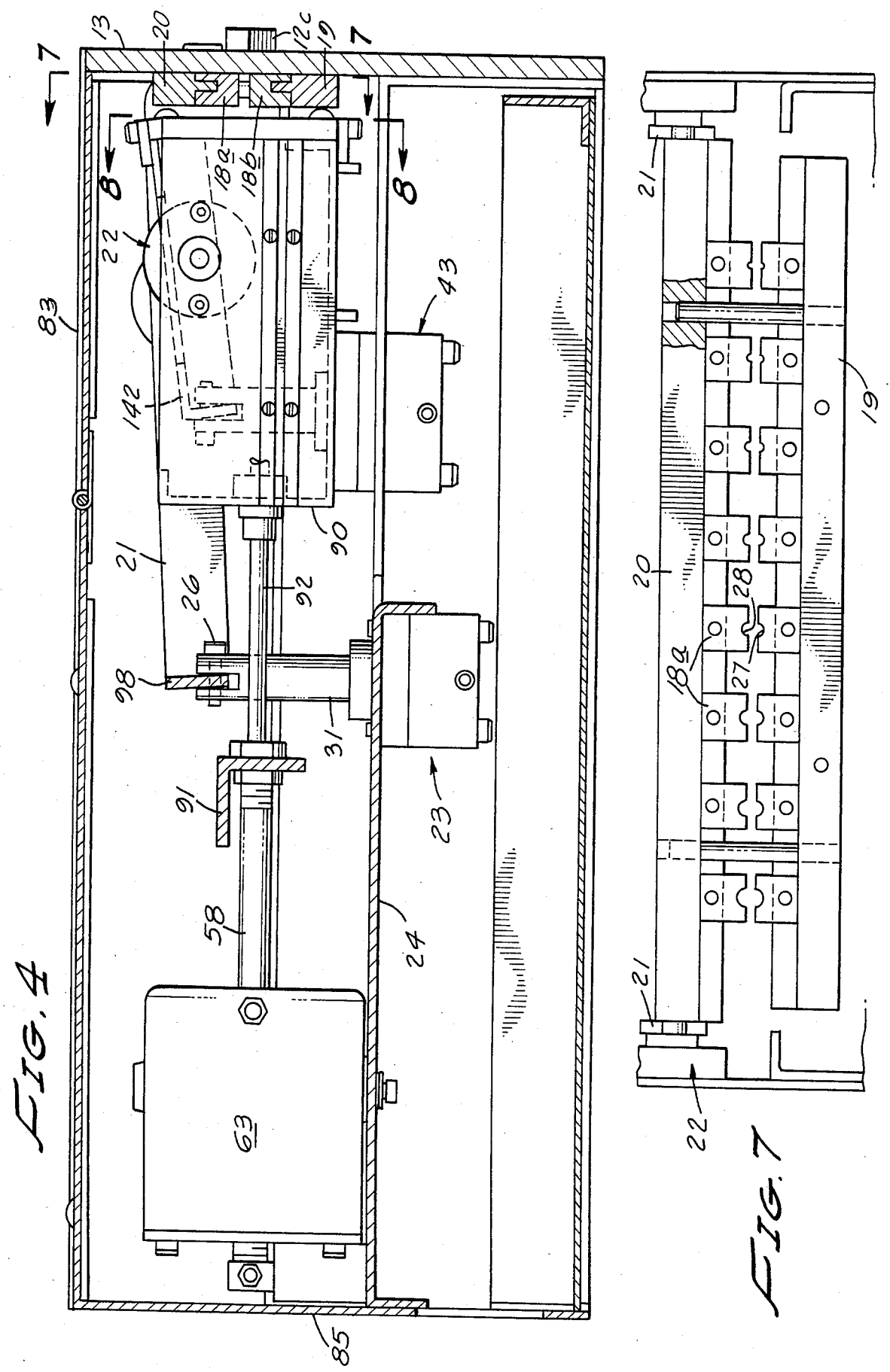

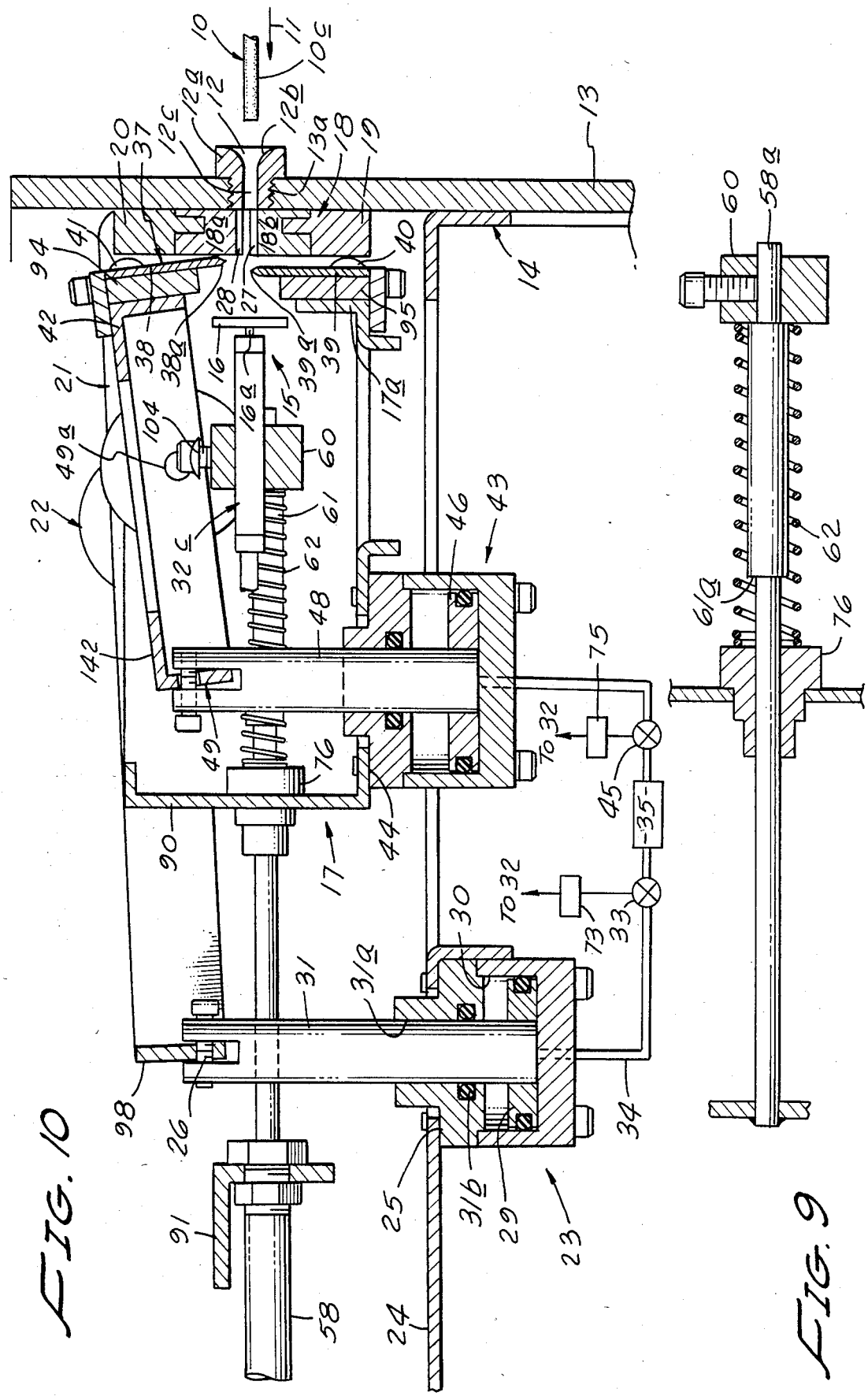

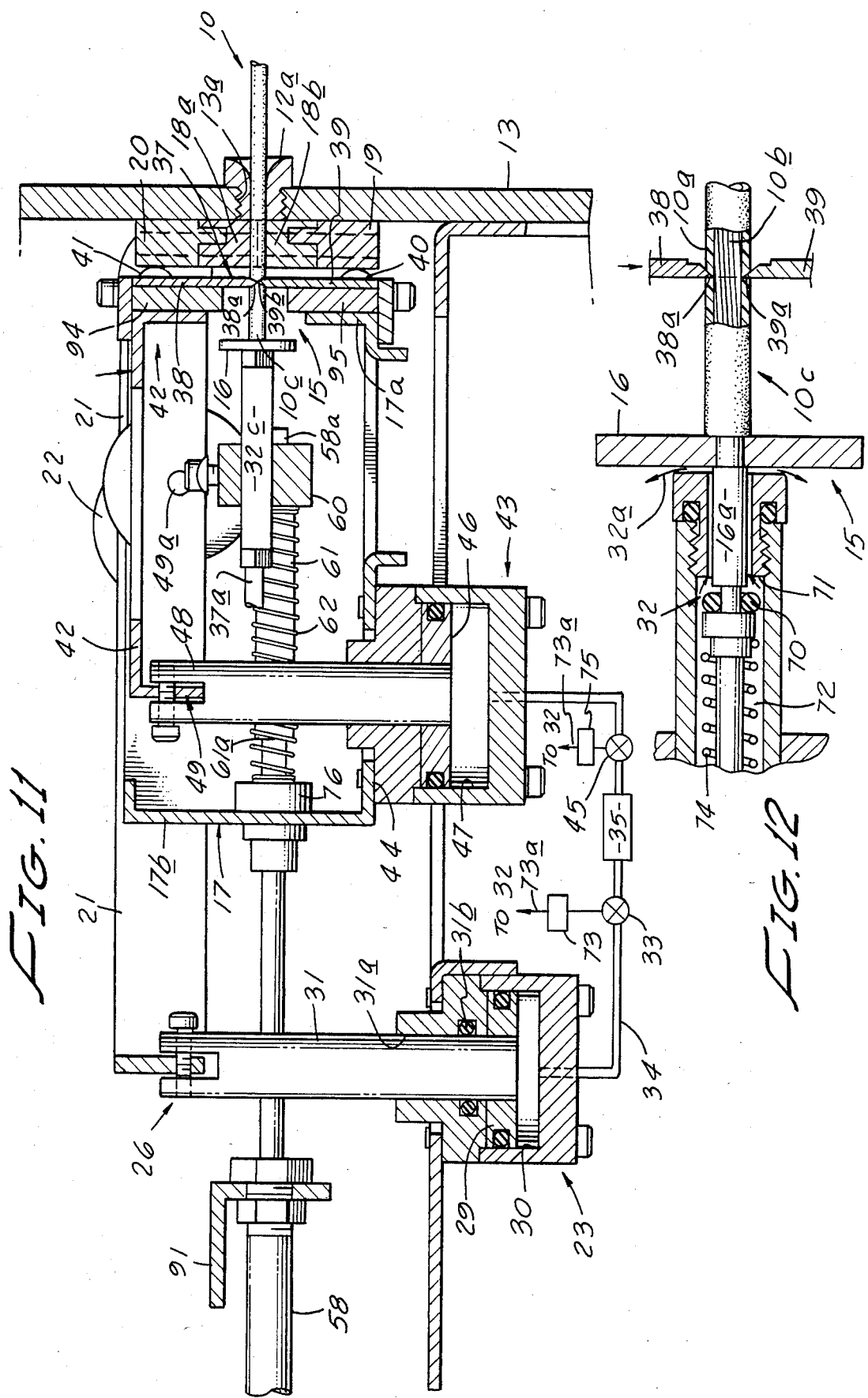

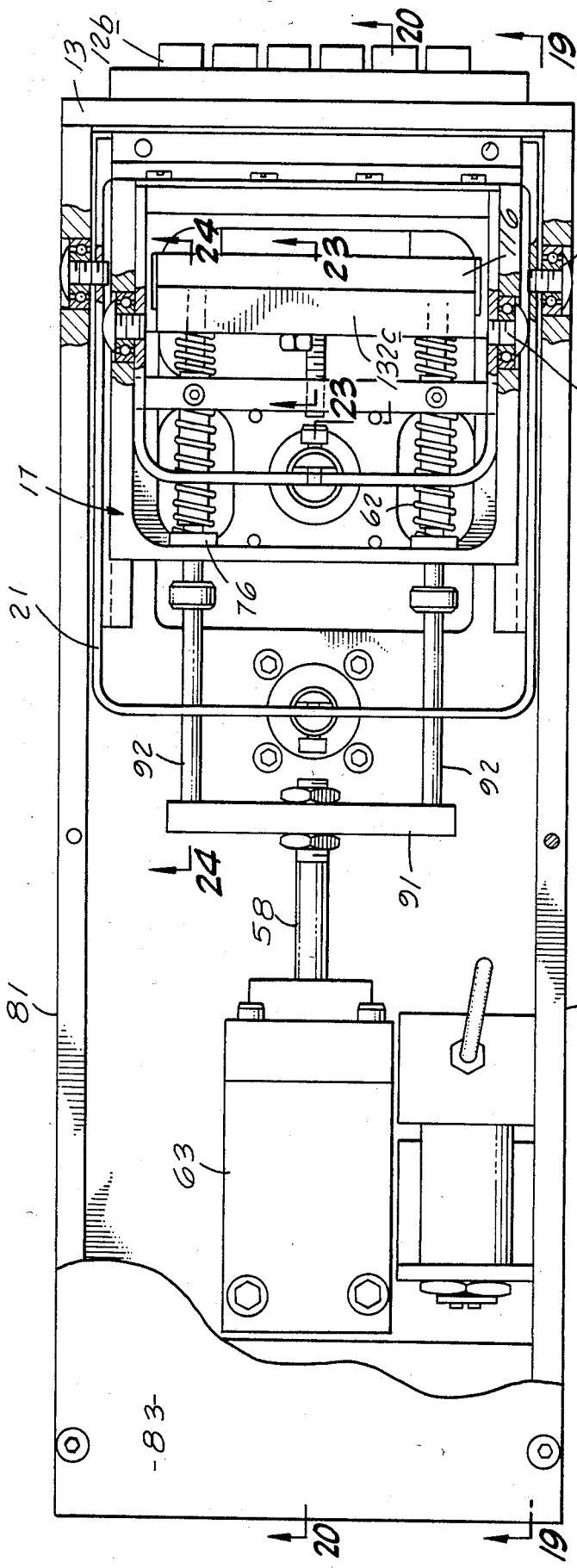
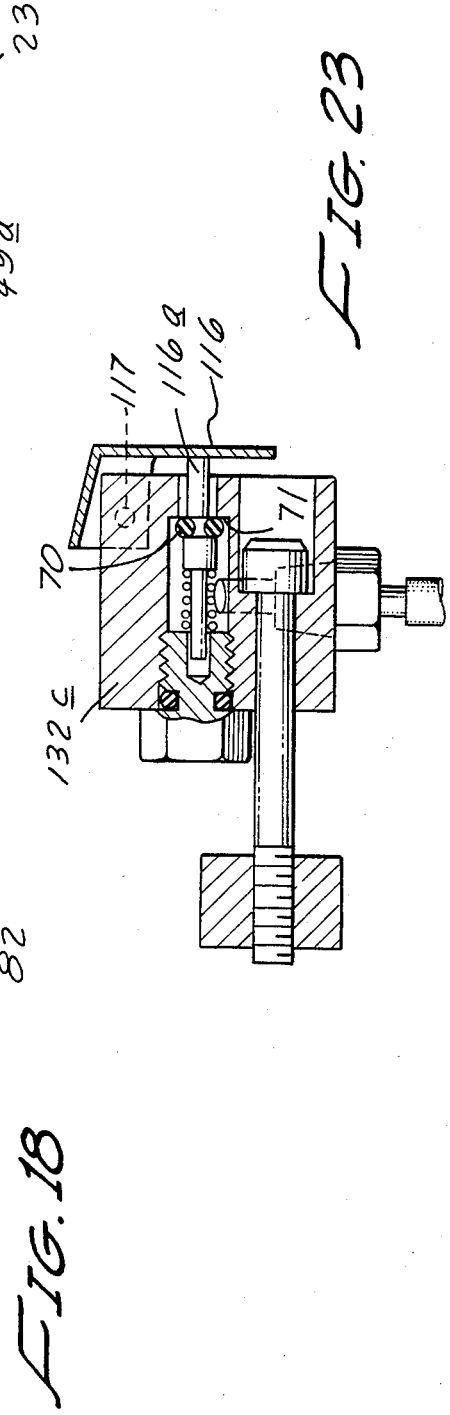
Fig. 18
Fig. 23

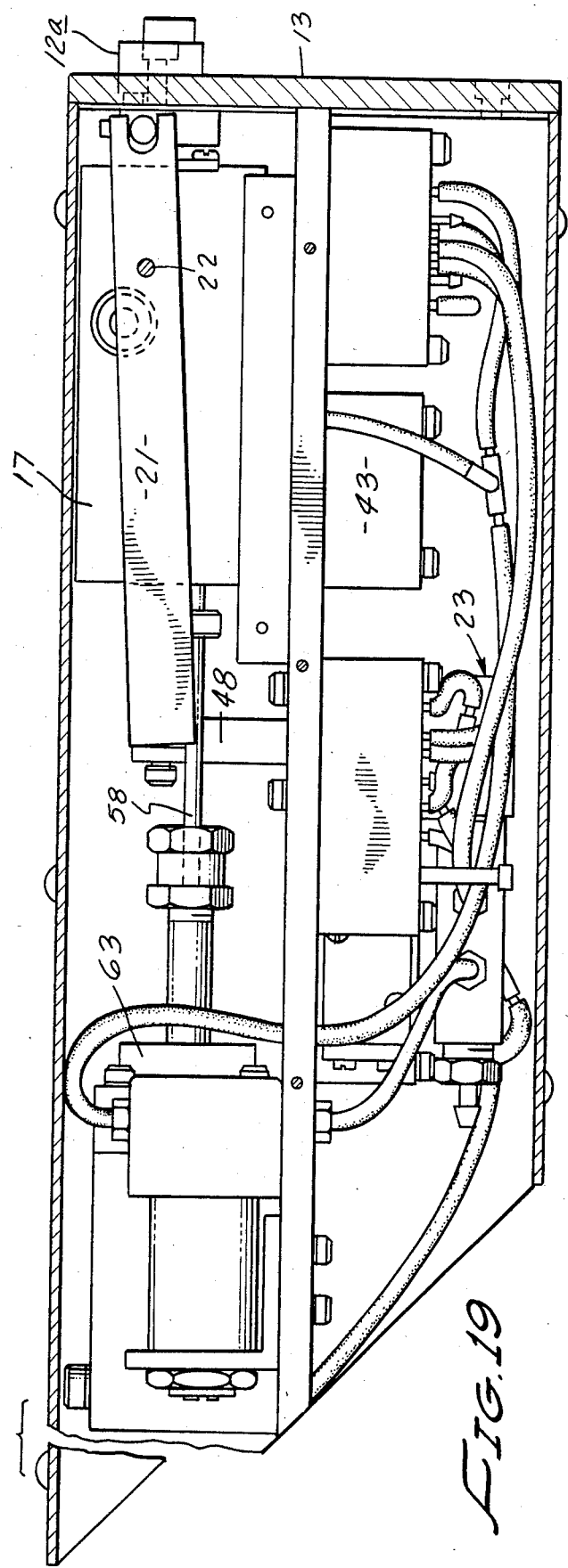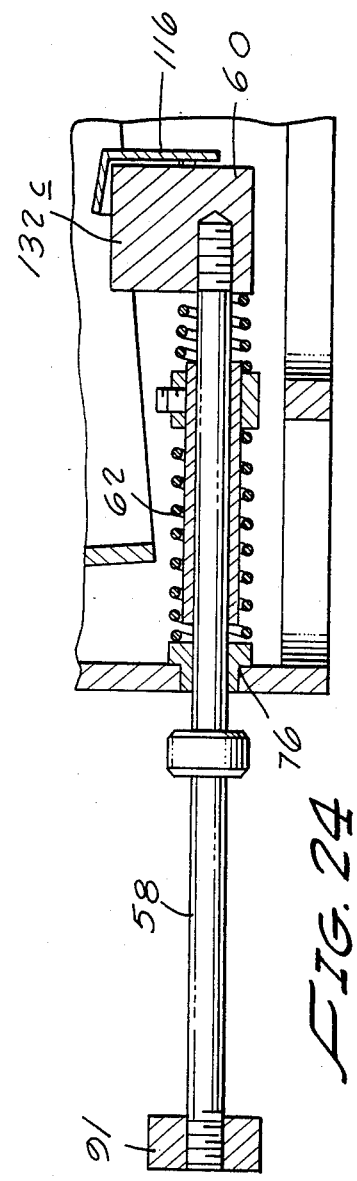

WIRE INSULATION STRIPPING APPARATUS

BACKGROUND OF THE INVENTION

This invention relates generally to the stripping of insulation off wire cores, at wire ends; and more specifically it concerns compact, automatically operable apparatus for controllably effecting the wire end stripping function, as well as being operable with respect to wires of different sizes.

Manual, or manually controlled tool stripping of wire ends is time consuming and inaccurate, and commonly results in damage to the wire core. The problem becomes acute as the diameter of the wire decreases, as extremely fine insulated wire is difficult to handle, and the thickness of the insulation becomes so small that damage to the core by the stripping tool becomes almost unavoidable. There is need for accurate, reliable, rugged and compact stripping apparatus that is capable of rapidly and accurately stripping insulation off wire ends of different diameters and sizes, without damage to the wire cores.

SUMMARY OF THE INVENTION

It is a major object of the invention to provide apparatus meeting the above need.

Basically, the apparatus of the invention comprises, in combination:

(a) a guide forming at least one opening to receive an insulated wire end, (b) wire end sensor means for sensing a wire end inserted through said opening, (c) wire end clamping means operable in response to said sensing to clamp said insulated wire inserted through said opening, (d) cutter means operable in response to said sensing to sever a predetermined length of insulation on said insulated wire end inserted through said opening, (e) and carriage structure carrying said sensor means and said cutter means to retract same relatively away from said clamp means after said clamp means has clamped said wire end and after said cutter means has severed said insulation, thereby to pull said selected length of insulation off the wire core.

Typically, and as will appear, the carriage structure includes a carriage mounted on a frame for movement toward and away from the wire guide, the structure having a retracted position in which the cutter means is retracted away from the bare wire end, thereby to allow said selected length of insulation to drop in spaced relation to said bare wire end. In this regard, the retracting means may advantageously be connected with the carriage structure to initially retract the sensor means relatively away from the cutter means prior to subsequent retraction of the carriage structure to said retracted position. This sequence of movements serves to develope space required for unobstructed free fall of the removed or stripped insulation slug.

It is a further object of the invention to provide multiple cutter blades on the carriage, and a pivoted arm carrying one of the blades, for pivoted movement relatively toward and away from another blade. A blade actuator on the carriage is operatively connected with said pivoted arm for effecting said pivoted movement.

It is another object of the invention to provide clamp means in the form of multiple clamp members, and additional structure carrying said members for movement of one member relatively toward and away from another member. Such additional structure may advantageously include a pivoted arm carrying said one member for pivoted movement toward and away from the other member, and including a clamp actuator on the frame and operatively connected to said pivoted arm.

Multiple of the wire entrance guides may be carried on an apparatus housing front panel to form different size bores to receive different diameter wires, there being one each of said sensor means, clamping means, and cutter means associated with each of the guides. In this environment, the carriage structure typically carries all of said sensor means and cutter means to retract them simultaneously relatively away from the clamp means and guides. Further, each of such clamp means may include fixed and movable clamp member, and including additional structure carrying all of said movable clamp members for simultaneous movement of the movable members relatively toward and away from the fixed members.

It is a further object to provide cutter means that includes multiple relatively fixed and movable blades, and including elongated relatively fixed and movable bars to which the blades are individually and removably connected, the movable blades carried by the movable bar and the fixed blades carried by the fixed bar, the blades having different size cutting edges corresponding to different wire insulation sizes.

Yet another object is the provision of means for adjusting the spacing of said sensor means from said clamping means, to enable selection of the length of insulation to be stripped off the wire core.

Finally, the blades associated with the fixed bar may be defined by a one-piece blade structure, and the blades associated with the movable bar defined by a one-piece blade structure. In this modified form, the clamp means may include relatively fixed and movable clamp members, one of which comprises an elastomeric body or bodies, having a lengthwise tapering surface of engagement with a selected wire end or ends.

As will be seen, the apparatus enables all operations to be carried out automatically, once a wire end to be stripped is inserted and sensed.

These and other objects and advantages of the invention, as well as the details of an illustrative embodiment, will be more fully understood from the following specification and drawings, in which:

DRAWING DESCRIPTION

FIG. 2 is a plan view on lines 2—2 of FIG. 1;

FIG. 3 is an enlarged cross-sectional elevational view, on lines 3—3 of FIG. 2;

FIG. 4 is an enlarged cross-sectional elevational view on lines 4—4 of FIG. 2;

FIG. 7 is a fragmentary cross-sectional elevational view on lines 7—7 of FIG. 4;

FIG. 8 is a fragmentary cross-sectional elevational view on lines 8—8 of FIG. 4;

FIG. 9 is a fragmentary cross-sectional elevational view on lines 9—9 of FIG. 2;

FIG. 10 is a fragmentary cross-sectional elevational view on lines 10—10 of FIG. 2, showing the basic apparatus in initial state;

FIG. 11 is a view like FIG. 10, showing wire reception by the apparatus, and wire end clamping, and cutter severing of wire insulation;

FIG. 12 is a view similar to FIG. 5, showing details of insulation severing, and sensor pressure pad displacement by the wire;

FIG. 18 is a top plan view on lines 18—18 of FIG. 17;

FIG. 19 is a fragmentary side elevational view on lines 19—19 of FIG. 18;

FIG. 23 is an enlarged fragmentary cross-sectional view on lines 23—23 of FIG. 18;

FIG. 24 is an enlarged fragmentary cross-sectional view on lines 24—24 FIG. 18;

BASIC APPARATUS AND OPERATION

Figure 1:
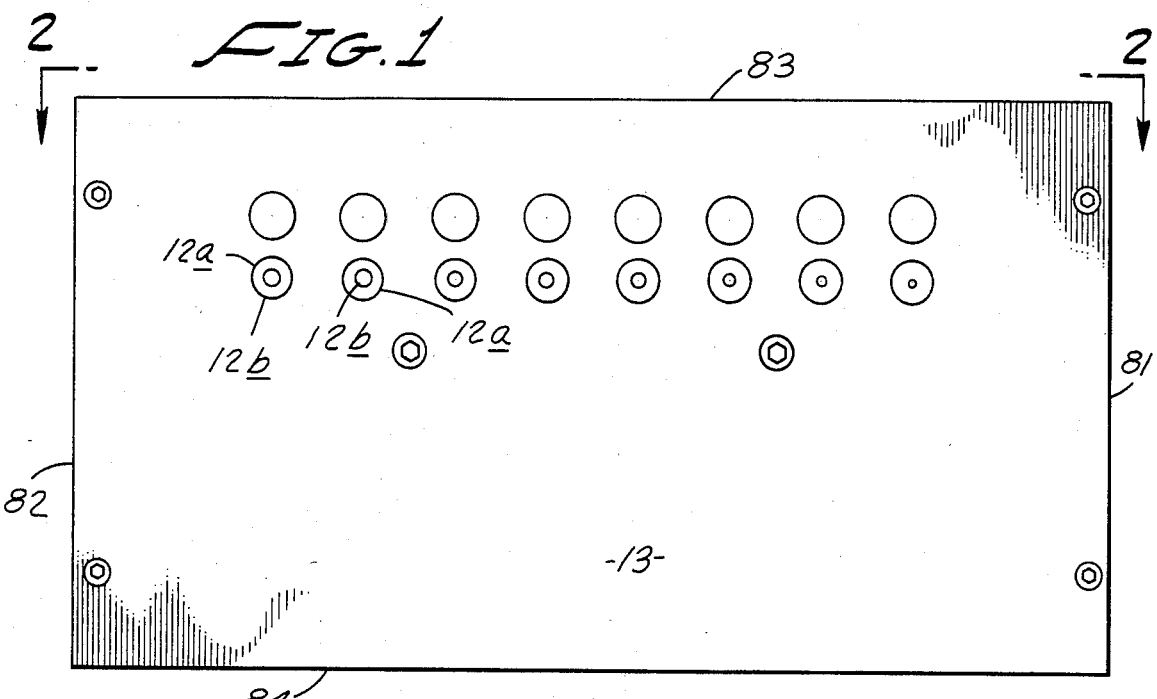
FIG. 1 is a front elevational view of stripper apparatus embodying the invention.

Referring first to FIG. 10, showing basic elements in initial state, a wire 10 is shown as being displaced leftwardly, in the direction of arrow 11, toward opening or mouth 12 formed by orifice member 12a carried by front panel 13 on frame 14. As shown in FIG. 12, the wire consists of an insulative sheath 10a on a metallic core 10b, the latter for example comprising a bundle of multiple fine strands, as shown. The insulated wire end 10c is guided by convergent surface 12b of the orifice member into and leftwardly through the opening, in alignment with and toward wire end sensor means, indicated generally at 15. Typically, the wire end is inserted into an orifice whose cylindrical bore 12c slidably fits (and thus is substantically the same as) the wire outer diameter.

Sensor means 15 operates to sense wire end 10c inserted through the opening, as for example when the wire end arrives at a position of engagement with the sensor pad or platen 16 facing rightwardly, in alignment with opening 12, and as shown in FIGS. 11 and 12. The sensor means 15 is carried by structure indicated generally at 17, and controllably operable to leftwardly retract the sensor means, as well as cutter means to be described, as will appear.

Also provided is wire end clamping means operable in response to sensing of the wire end by the sensing means to clamp the insulated wire inserted through opening 12, as for example in the wire end position of engagement with pad 16, as shown in FIGS. 11 and 12. One unusually advantageous clamping means 18 as illustrated, including multiple clamp members, such as upper and lower members 18a and 18b carried adjacent the inner side of panel 13, and proximate the inner end of orifice member 12a retained to panel 13 as by threading at 13a, allowing orifice member replacement as by members having larger or smaller bores fitting different wire sizes. Lower clamp member 18b is shown as carried by a part 19 attached to panel 13, member 18b having an upwardly opening, U-shaped surface 27 adapted to fit and clamp against the underside (i.e. under one-half) of the wire insulative sheath.

Upper clamp means 18a is carried by part 20, which is in turn carried by arm 21 pivoted to the outer frame (indicated at 22) for up and down movement of member 18a relative to member 18b. A clamp actuator 23 is shown as carried at 25 by the frame member 24, and it is pivotably connected at 26 with arm 21 so as to rock arm 21, to displace clamp member 18a up and down. Member 18a has a downwardly opening, U-shaped surface 28 adapted to fit and clamp against the upper side (i.e. upper one-half) of the wire insulative sheath proximate opening 12; at the same time, the clamp surface 28 urges the sheath downwardly against clamp surface 27, so that the wire is firmly grasped or clamped, without permanently deforming the sheath, due to the like, semi-circular, U-shapes of the surfaces 27 and 28 being only slightly smaller, radially, than the sheath surface radius. Actuator 23 may comprise a pneumatic actuator, having a piston 29 and cylinder 30, the piston connected via plunger 31 with the arm 21, as described. A guide bore for plunger 31 is indicated at 31a, and sealed at 31b. Clamp members 18a and 18b may have tongue and groove connections with parts 20 and 19, to facilitate ease of replacement.

When pad 16 is slightly displaced leftwardly by the wire end, its stem 16a operates a pilot valve, generally indicated at 32 in FIG. 12, to release air pressure indicated by arrows 32a. Such release in turn effects operation of a valve 33 shown schematically in FIG. 11, which in turn supplies air pressure at 34 to actuator 23, as from a source 35 indicated in FIG. 11. FIG. 12 shows O-ring seal 70 displaced from seat 71, allowing air pressure escape from space 72 as indicated by arrows 32a. Lowered pressure in turn effects operation of valve 33 as via a suitable actuator 73 connected via line 73a to the pilot valve housing 32c (see FIG. 5). Note pilot valve return spring 74 urging seal 70 toward seat 71, as in FIG. 5.

The above referenced cutter means is operable in response to sensing of the wire end arrival at clamped position to sever a predetermined length of insulation on the insulated wire inserted through the opening 12, thereby to form insulation stub 50. One unusually advantageous cutter means, illustrated generally at 37, includes multiple blades 38 and 39 (see FIG. 10) supported on the carriage structure 17, for relative movement toward and away from one another. As shown, lower blade or jaw 38 is removably attached at 40 to frame part 17a of carriage 17, to extend upright and terminating at cutting edge 38a. Upper blade or jaw is removably attached at 41 to arm 42 to be carried for pivoted movement relatively toward and away from blade 38. Blade 39 extends generally downwardly to terminate at cutting edge 39a. The blades are easily replaced, as facilitated by their removable attachments at 40 and 41 to structure 17 and arm 42.

Blade actuator 43 is mounted at 44 to carriage 17 and is operatively connected with the pivoted arm 42 for effecting its pivoted movement, causing blade 38 to co-operate with blade 39 to sever the insulation. As shown, the actuator may be pneumatically operated, to receive air pressure via valve 45 for upwardly displacing piston 46 in cylinder 47. Piston rod 48 is pivotally connected at 49 with arm 42, which is in turn pivotally connected at 49a to carriage 17, whereby upward movement of piston 46 effects downward movement of blade 38 toward blade 39. The blade edges 38a and 39a typically have opposed semi-circular U-shapes sized to sever the insulation but not to penetrate or sever the wire core. See FIG. 12. valve 45 may also be operated, with built-in delay, in response to operation of pilot valve 32 as described above, a suitable delay effecting actuator being shown at 75. Accordingly, the wire is clamped just prior to the time that the insulation is severed.

Figure 13:
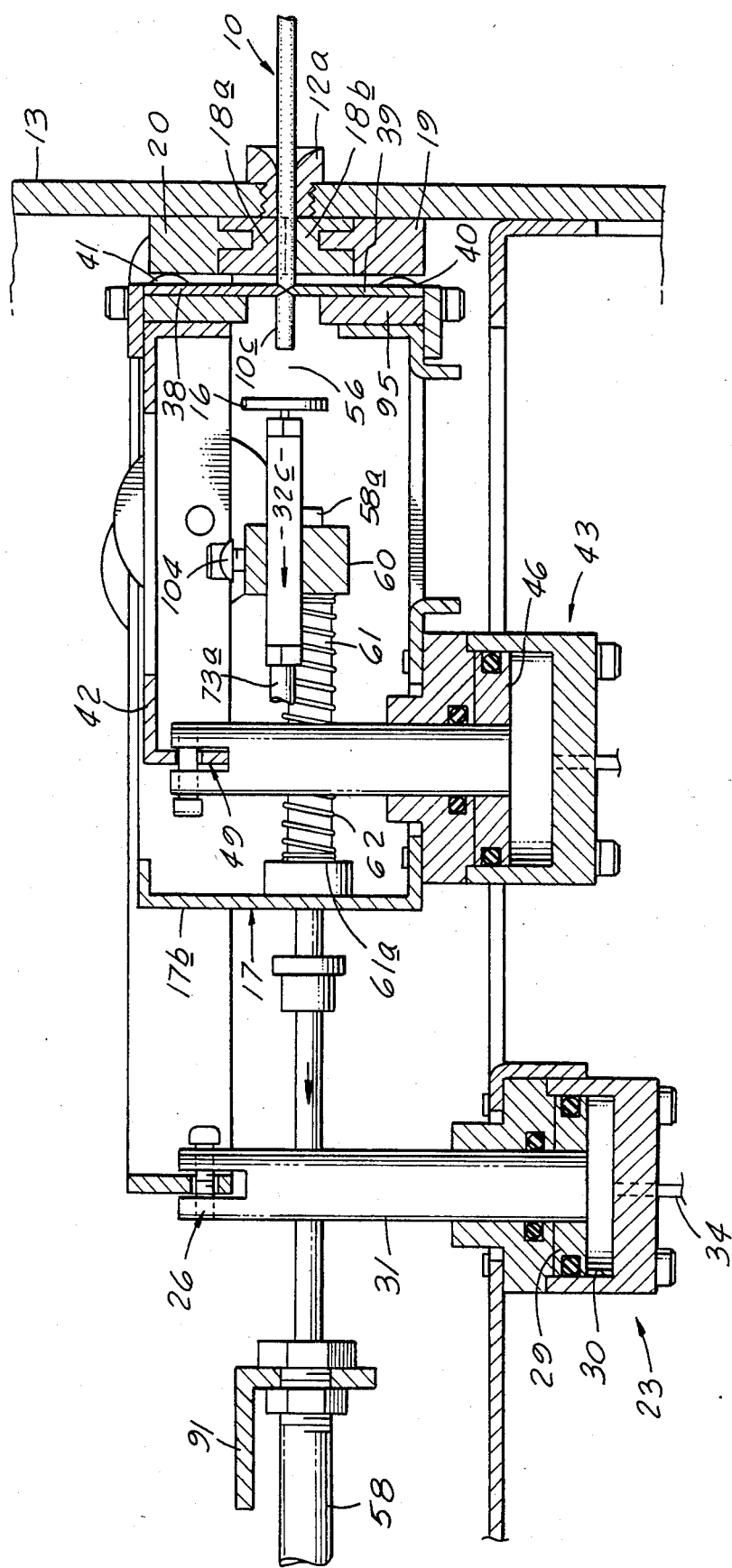
FIG. 13 is a view like FIGS. 10 and 11, but showing initial retraction of the sensor means relative to the clamped wire end.
Figure 14:
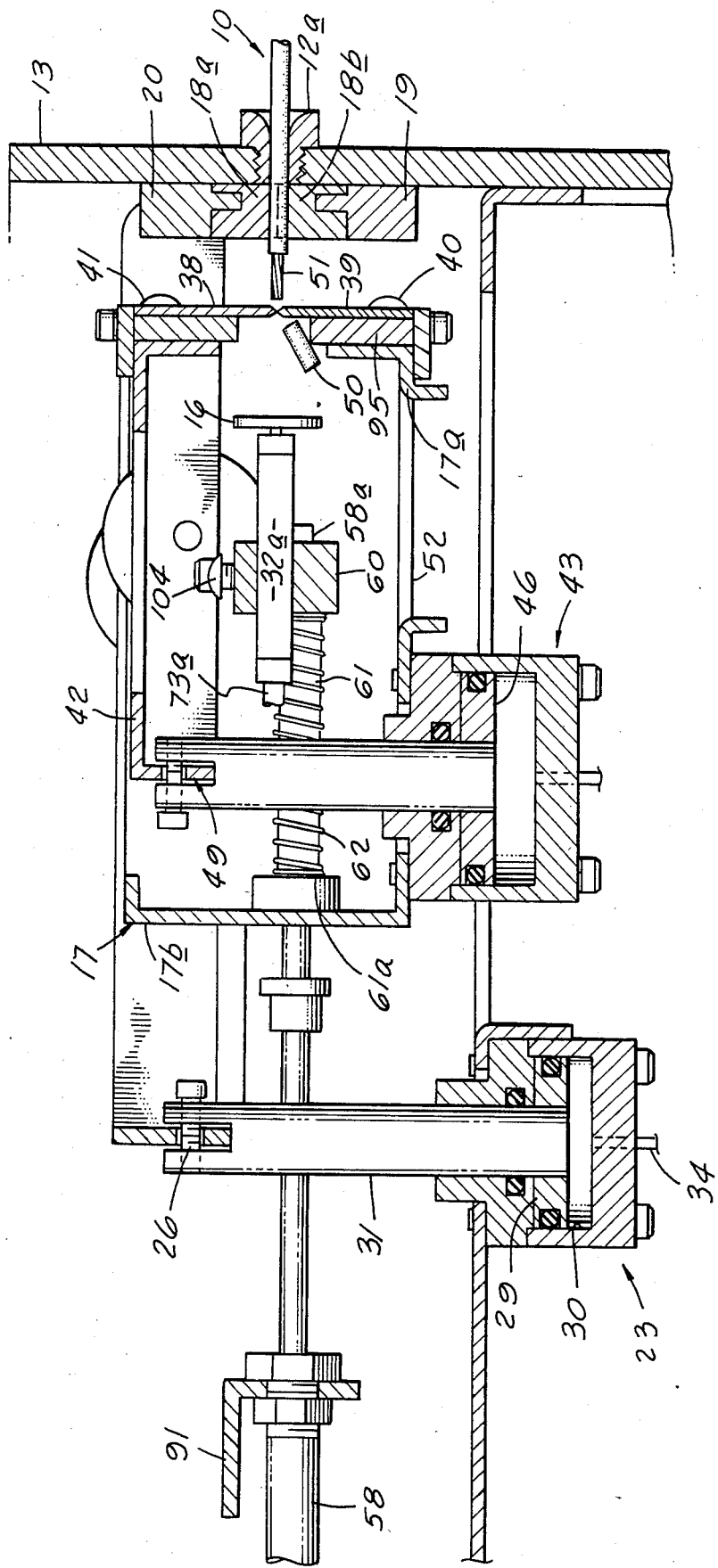
FIG. 14 is a view like FIGS. 10, 11 and 13, but showing continued retraction of the sensor means, plus retraction of the insulation cutter, to pull a severed insulation stub off the wire core.
Figure 15:
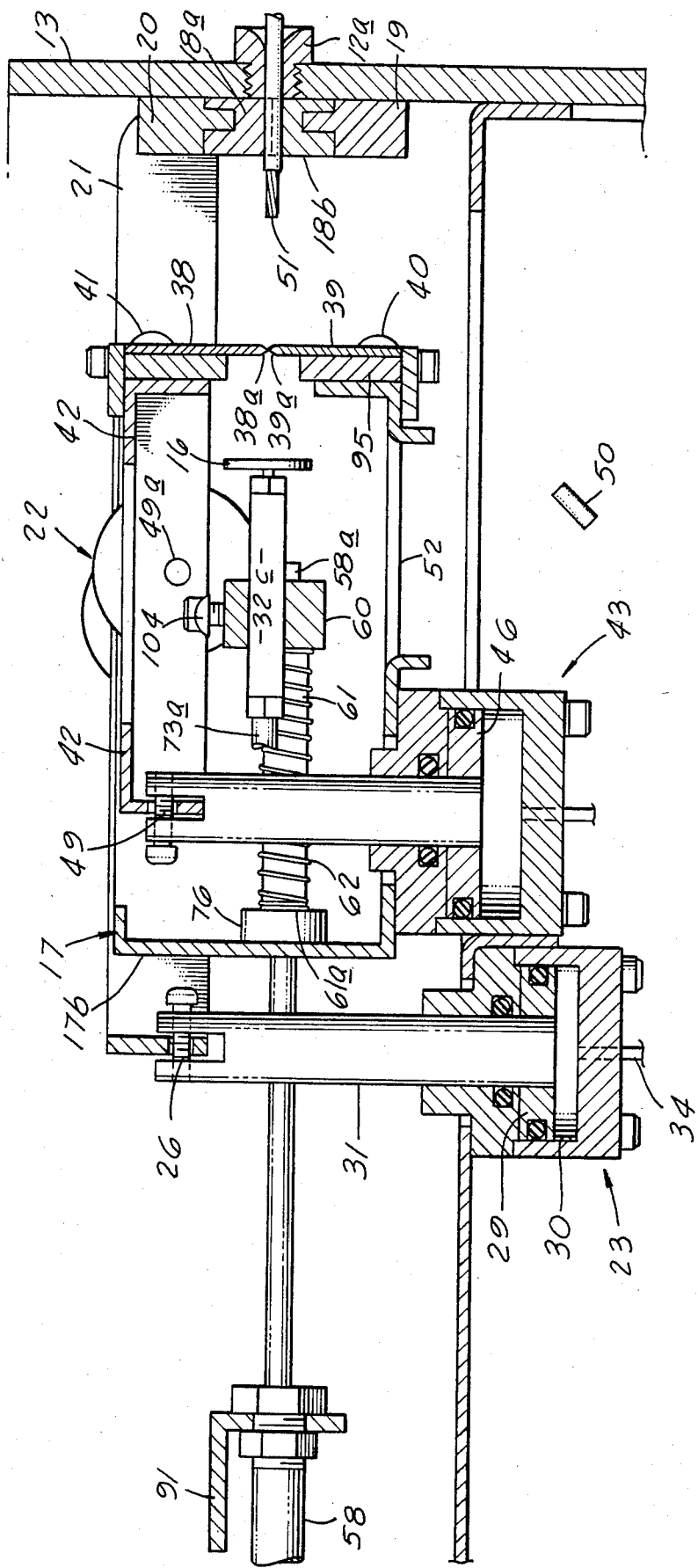
FIG. 15 is a view like FIG. 14, but showing full retraction of the sensor means and insulation cutter, enabling unobstructed free fall of the removed insulations stub.

The carriage structure 17 carrying the sensor means and cutter means, as described, is also operable to retract these elements relatively away (i.e. leftwardly) from the clamp means, after the latter has clamped the wire and also after the cutter means has severed the insulation; as a result, a selected length or slug of insulation 50 is pulled free, by the blades 38 and 39, off the core end 51, as appears in sequence in FIGS. 13-15, the slug falling downwardly and through a lower opening 52 defined by the carriage structure 17. The retracting structure first retracts the sensor pad 16 leftwardly away from the wire end (see FIG. 13), and then further retracts the sensor means together with the cutter means leftwardly (see FIG. 14), whereby sufficient space is developed as at 56 in FIG. 13 for allowing removal and free fall of the severed insulation slug, as both the sensor pad 16 and cutter blades 38 and 39 are further retracted leftwardly, as in FIGS. 14 and 15.

To this end, a horizontally extending retraction shaft 58 may be suitably mounted for horizontal leftward and rightward movement. A shaft extension 58a mounts the sensor pilot valve housing 32c as via mounting structure 60. The latter is mounted on a horizontal plunger 61, the leftward end 61a of which is spaced from annular base 76 on carriage frame part 17b, in FIG. 10. Helically cooled spring 62 extends about plunger 61, and between the mounting structure 60 and base 76. As the shaft 58 is pulled to the left (as by a pneumatic actuator schematically indicated at 63 in FIG. 2), the mount 60 and pad 16 are moved leftwardly with shaft 58. The spring 62 is simultaneously compressed by structure 60 until plunger left end 61a engages base 76, at which time the carriage 17 is displaced leftwardly, pulling the blades and severed sheath or stub 50 leftwardly. The slight friction of engagement of the stub 50 with the wire core 10b prevents initial leftward movement of the carriage 17 with the shaft 58, by force transmission through return spring 62.

Figure 16:
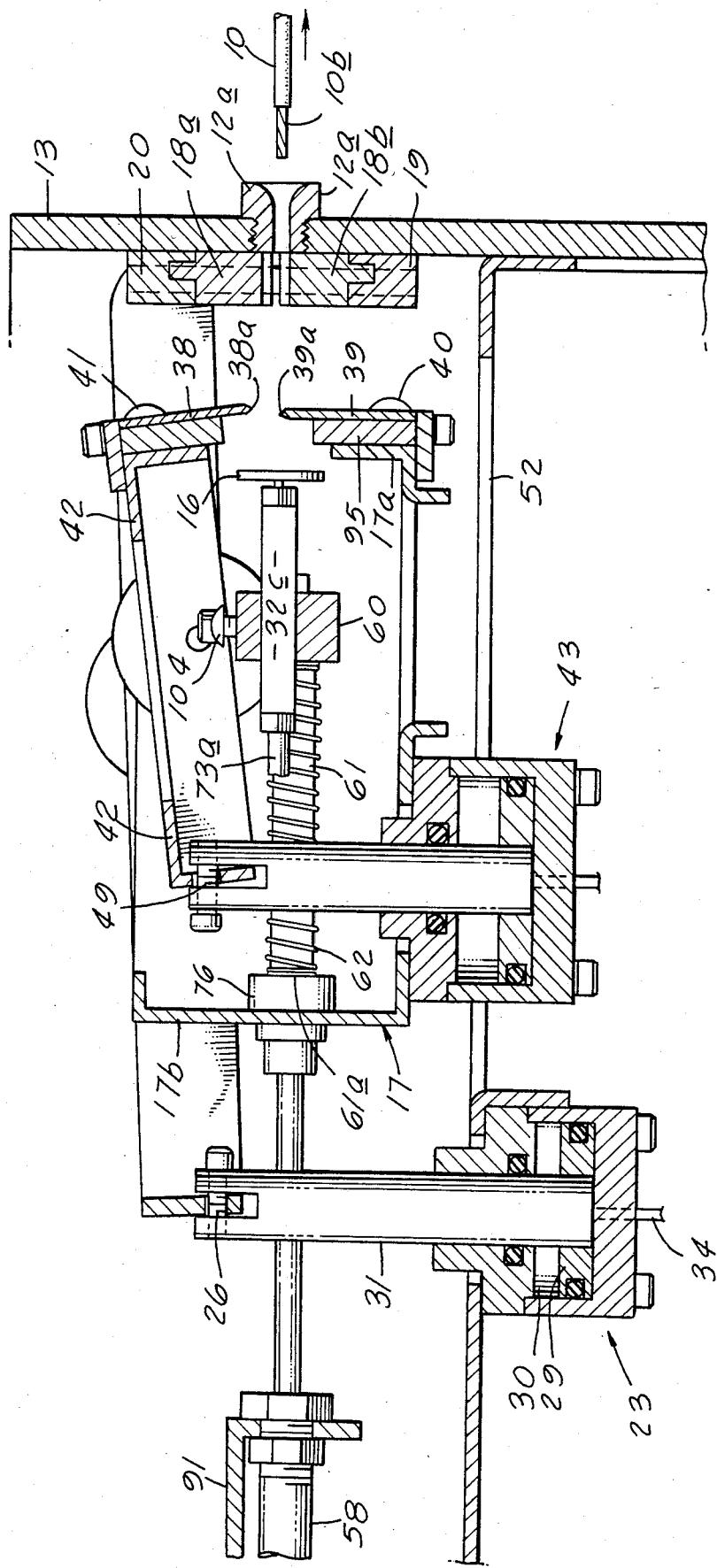
FIG. 16 is a view like FIG. 15, but showing the elements during their return stroke toward intitial state, as in FIG. 10.
Figure 17:
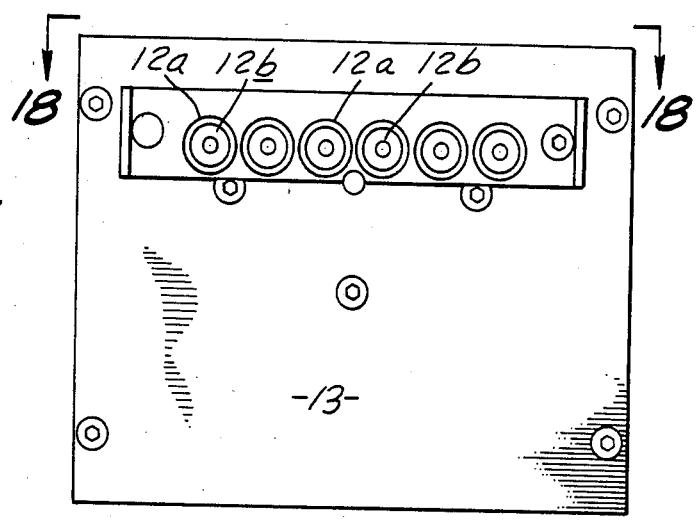
FIG. 17 is a front elevational view like FIG. 1, but showing modified apparatus.
Figure 21:
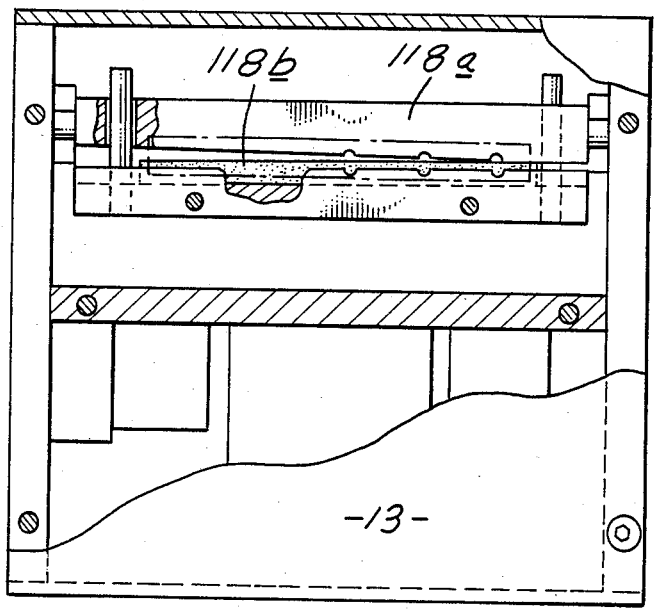
FIG. 21 is a cross-sectional and frontal elevational view on lines 21—21 of FIG. 20.

FIG. 16 shows rightward retraction of the stripped wire from the apparatus after unclamping of the wire sheath, as well as rightward return of the carriage 17, with blades 38 and 39 separated; and FIG. 10 shows the return of the elements to initial position, for reception of the next insulated wire end to be stripped. In this regard, the valves for the actuators may be four-way valves to control air pressure application to, and escape from, opposite sides of the pistons 29 and 46.

DETAILED DESCRIPTION

Referring now to FIGS. 1 and 2, the apparatus described above may advantageously be incorporated in a housing 80 having front panel 13 as described above, side walls 81 and 82, top and bottom walls 83 and 84, and rear wall 85. A row of wire guiding orifice members 12a is provided, the members having successively smaller bores or openings 12c corresponding to different size wires to be inserted and stripped. Corresponding sets of sensor means, clamping means and cutter means are provided, one set for each orifice member, as shown, each set having the construction as shown in FIGS. 10-16, and described above.

More specifically, the carriage structure 17 referred to above carries all of the sensor means and cutter means, to retract them simultaneously away from the clamp means and orifice guides. To this end, the carriage structure is shown to include transverse frame member 90 to which retraction shaft 58 is connected via transverse bar 91 and rods 92. Frame member 90 also appears in FIGS. 10 and 11, and two of the bases 76 and plungers 61 are shown, for carrying the sensor mounting structure 60 in the form of an elongated transverse bar.

Two cutter arms 42 are shown connected to elongated transverse bar or arm extension 142 operated by actuator 43, to rock or pivot the arm 42, as described above. The multiple cutters are carried as shown in FIGS. 2, 4 and 8 by elongated transverse upper and lower bars 94 and 95, which also appear in FIGS. 10 and 11. FIG. 8 shows that the upper and lower cutters are individually removable and replaceable, as facilitated by the separate connectors 41 and 40, described above.

FIG. 7 shows a lower transverse row of fixed clamp members 18b carried by fixed clamp part or bar 19, and an upper transverse row of movable clamp members 18a carried by movable (up and down) part or bar 20. The latter is carried by the two pivoted arms 21. A transverse cross-piece 98 is connected to the arms 21, and is in turn connected to and operated by actuator 23, as shown. Accordingly, the movable clamp members 18a are simultaneously movable up and down relative to the fixed clamp members 18b; also, the clamp members are individually removable and replaceable.

Figure 5:
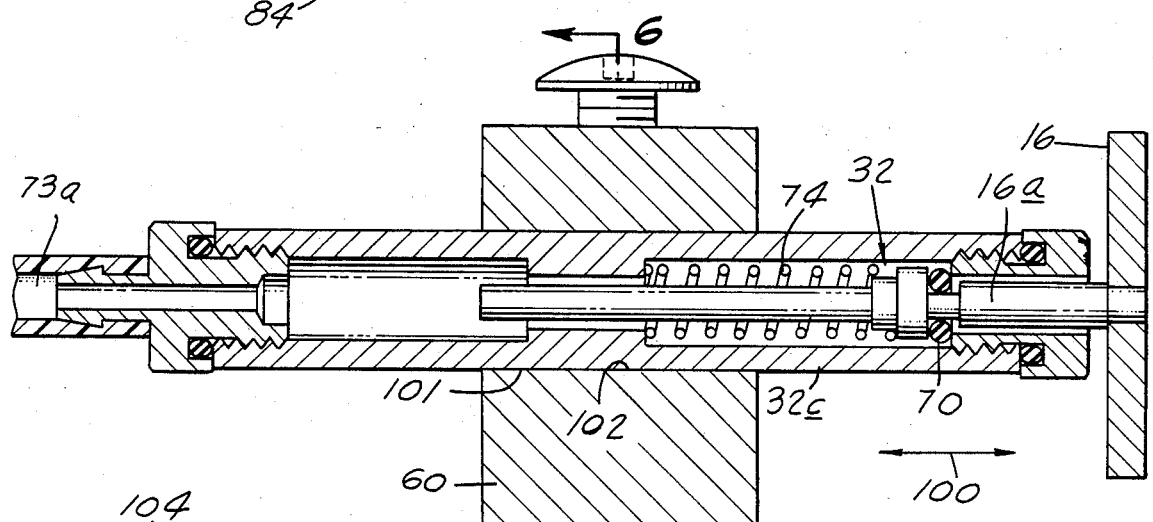
FIG. 5 is an enlarged fragmentary elevational view on lines 5—5 of FIG. 2.
Figure 6:
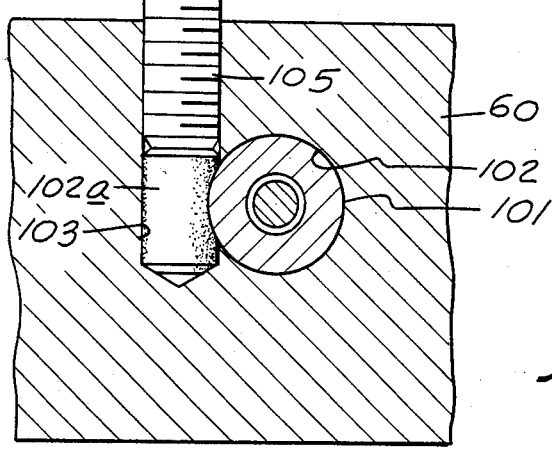
FIG. 6 is a section taken on lines 6—6 of FIG. 5.

Referring now to FIGS. 5 and 6 the pilot valve housing 32c and associated pad 16 are shown as adjustable lengthwise in direction 100, i.e. toward and away from the orifice via which the wire is inserted for engagement with the pad. Note that housing cylindrical surface 101 is slidable in bore 102 in mount 60. Friction material, such as an elastomer body 102a extends adjacent the surface 101, in a bore 103 that sidewardly intersects bore 102. When a pressurizing fastener 104 is rotated in one direction, it is advanced by thread 105 to squeeze material 102a, which then frictionally grips the surface 101, preventing movement of housing 32c relative to mount 60. When fastener 104 is rotated oppositely, it relieves material 102a, allowing adjustment shifting of the housing 32c and pad 16 toward or away from the orifice guide and assocaited wire clamp, to enable selection of the length of insulation to be stripped off the wire end.

FIGS. 2 and 3 also show air pressure ducting 105 extending to valves and to the actuators, as described above.

MODIFICATION

FIGS. 17-24 show a somewhat modified device, having, however, the same principles and modes of operation as the apparatus described in FIGS. 1-16. Corresponding parts bear the same numbers. The FIGS. 17-24 device is smaller and more compact than the FIGS. 1-16 device.

Figure 25:
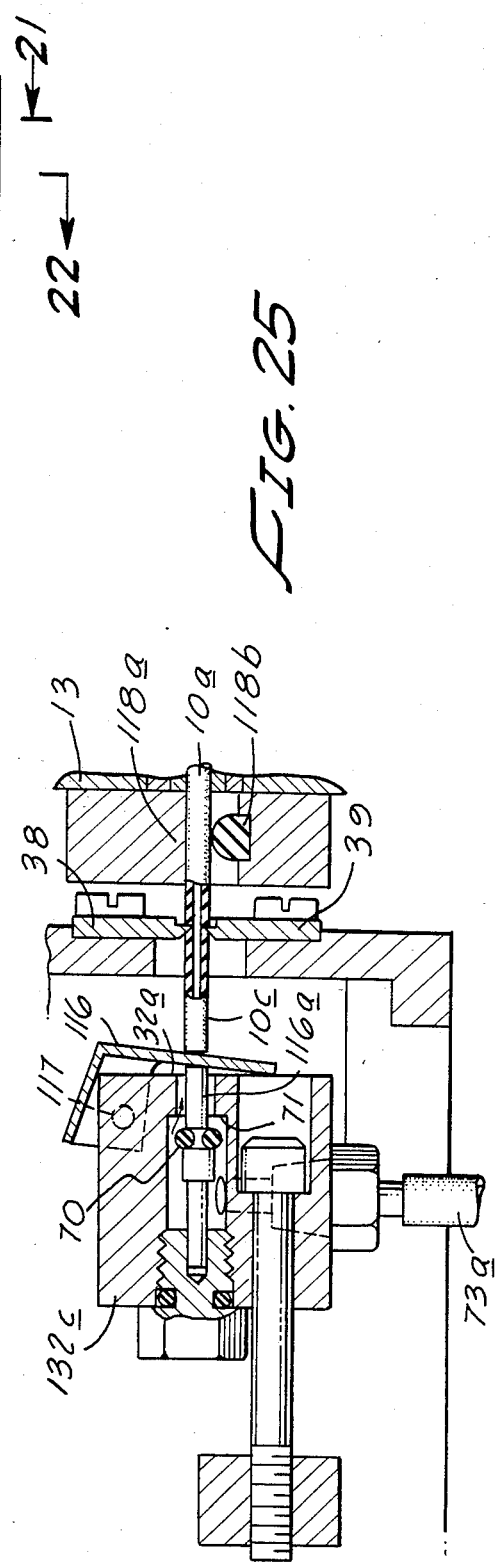
FIG. 25 is a view like FIG. 23, showing an operating or wire sensing mode of the elements.

FIGS. 23-25 show a somewhat modified sensor means, wherein a pressure pad 116 is pivoted at 117 to the pilot valve housing 132c. FIG. 25 shows a wire end engaging the sensor pad 116 to pivot it leftwardly (relative to unpivoted position seen in FIG. 23), therey to displace the pilot valve stem 116a leftwardly, unseating O-ring seal 70 away from seat 71, whereby air pressure then bleeds outwardly (see arrows 32a). Such air pressure reduction is communicated to valve actuators as at 73 and 75 described previously, via line 73a.

The clamp means for the wire also has somewhat different construction. In FIG. 25, the lower clamp member 118b comprises an elastomeric body with convex upper surface to engage and retain the wire when upper clamp member 118a presses down on the wire end extent 10d. Clamp member 118b tapers endwise, as appears in FIG. 21, to accomodate different size wires.

The structure of pneumatic actuator 63 is also shown, and includes piston 150 slidable rightwardly in cylinder bore 151 when air pressure is delivered to chamber 152, via line 153. Pressure in chamber 154 at the right of piston 150 is discharged via line 155 to a 4-way valve, to which line 153 is also connected, whereby back and forth stroking of the carriage 17 is achieved. Actuators 23 and 43 are substantially the same in structure and function, as described earlier.

Figure 22:
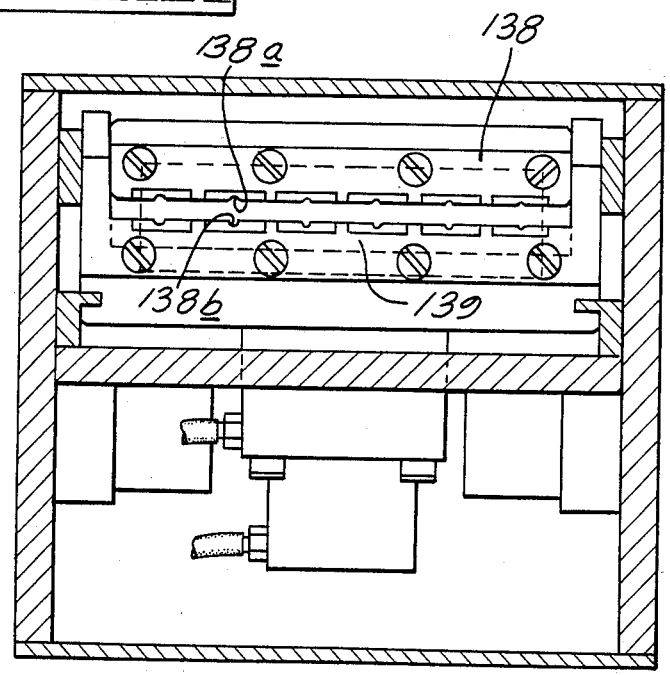
FIG. 22 is a cross-sectional, elevational view on lines 22—22 of FIG. 20.

FIG. 22 shows that only one transverse upper blade member 138, and one transverse lower blade member 139, are employed. Each such blade member, however, defines multiple, transversely spaced, insulating cutting jaws or edges, indicated at 138a and 138b. Such edges may be of different sizes, to accomodate different diameter insulations sleeves on wire cores.

Figure 20:
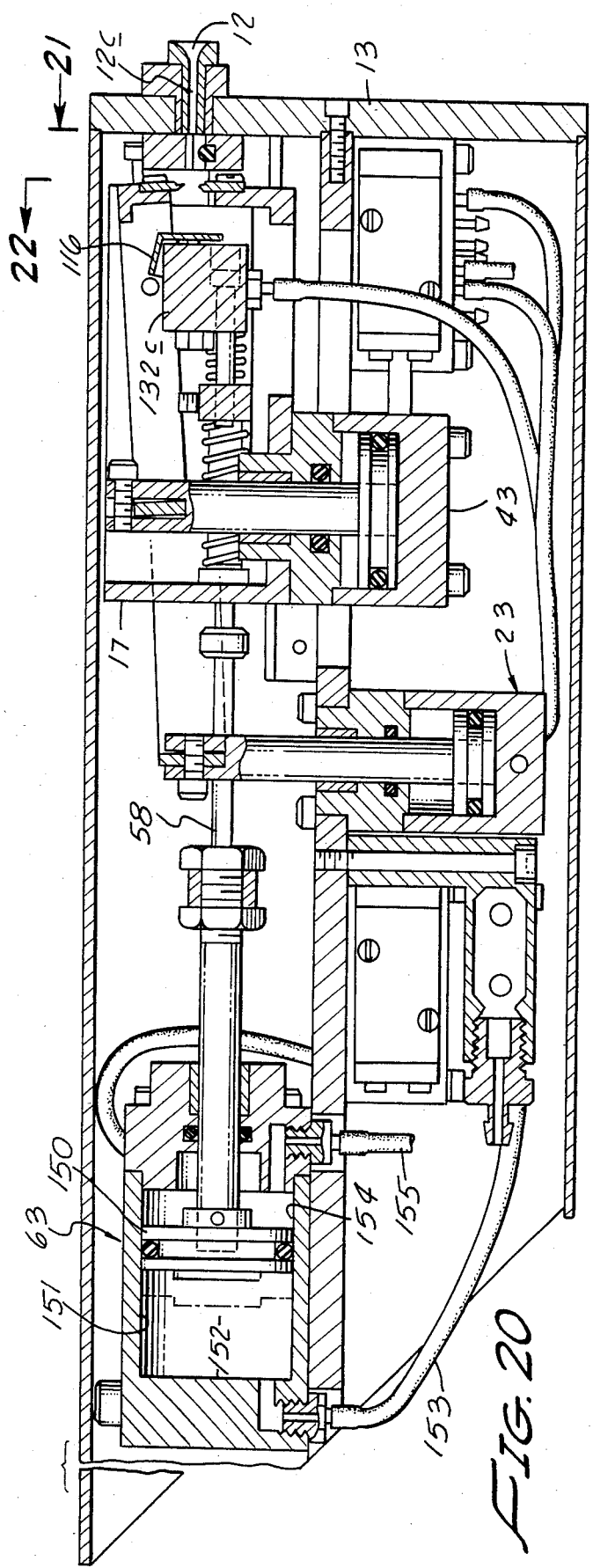
FIG. 20 is a cross-sectional, side elevational view taken on lines 20—20 of FIG. 18.
Figure 26:
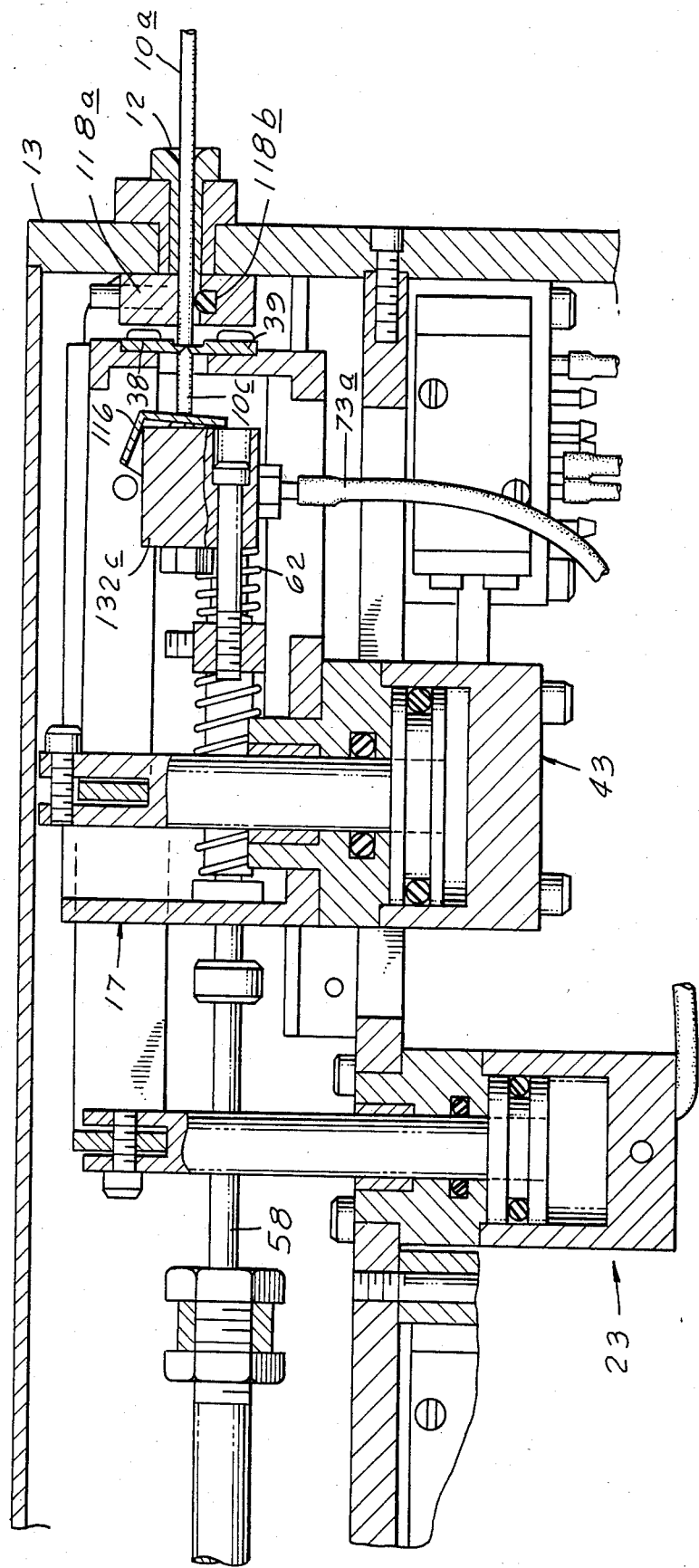
FIGS. 26-28 are side elevations, in section, showing different sequential positions of the apparatus of FIGS. 17-25.
Figure 27:
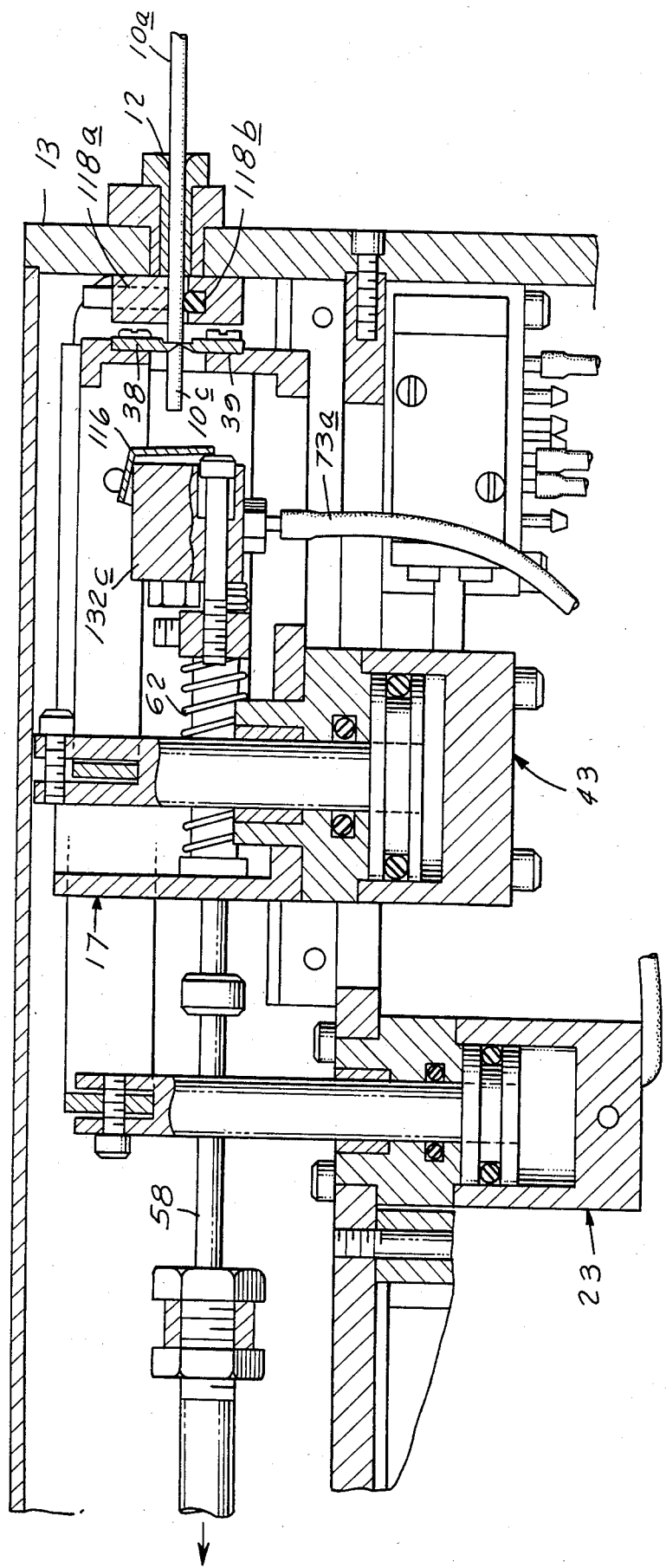
Figure 28:
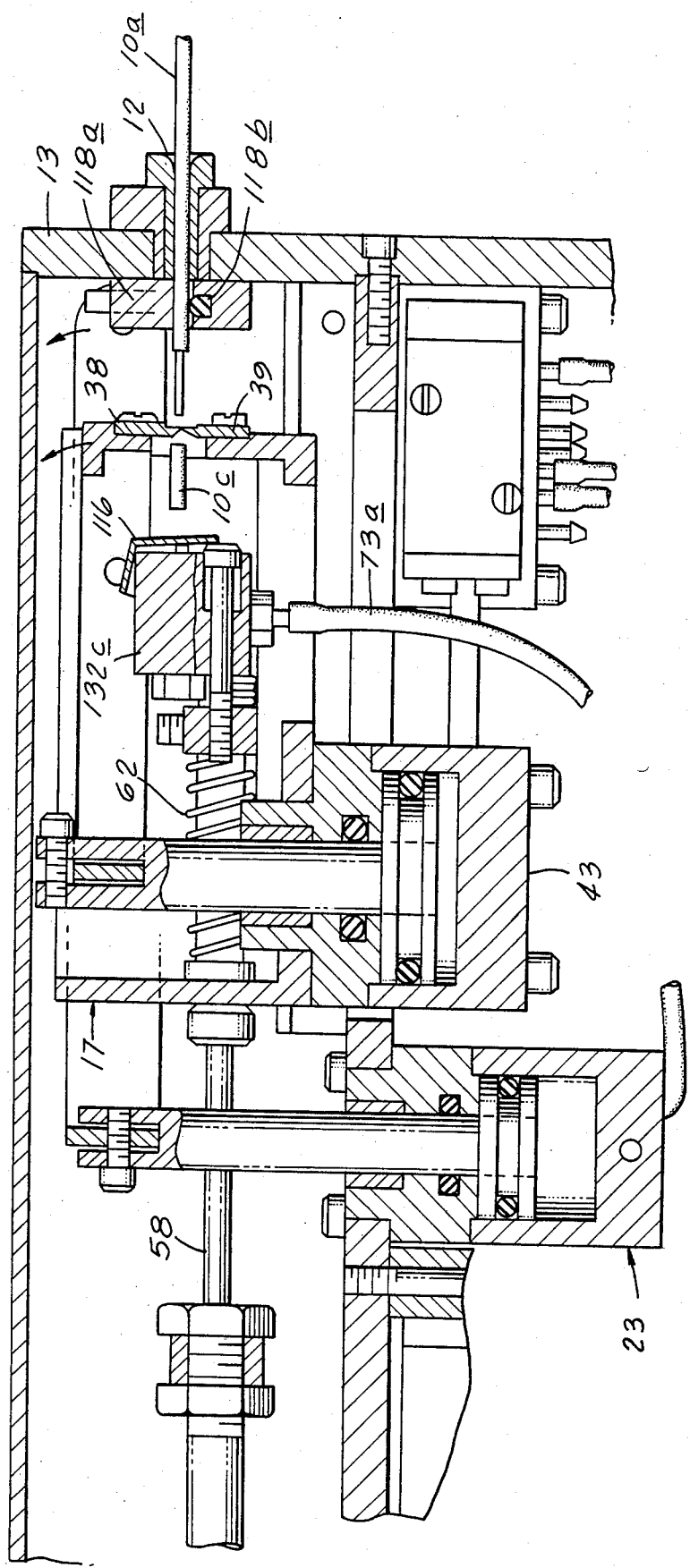

FIG. 20 corresponds to FIG. 10; FIG. 26 corresponds to FIG. 11; FIG. 27 corresponds to FIG. 13; and FIG. 28 corresponds to FIG. 14.

I claim:

1. Wire stripping apparatus for stripping insulation off a wire core, comprising:
   (a) a guide forming at least one opening to receive an insulated wire end,
   (b) wire end sensor means for sensing a wire end inserted through said opening,
   (c) wire end clamping means operable in response to said sensing to clamp said insulated wire inserted through said opening,
   (d) cutter means operable in response to said sensing to sever a predetermined length of insulation on said insulated wire end inserted through said opening,
   (e) and carriage structure carrying said sensor means and said cutter means to retract same relatively away from said clamp means after said clamp means has clamped said wire end and after said cutter means has severed said insulation, thereby to pull said selected length of insulation off the wire core,
   (f) a housing for said apparatus, the housing having a front panel, there being multiple of said guides carried by said front panel and forming different size bore to receive different diameter wires, there being one each of said sensor means, clamping means, and cutter means associated with each of the guides,
   (g) said carriage structure carrying all of said sensor means and cutter means to retract them simultaneously relatively away from the clamp means and guides,
   (h) each of said clamp means including fixed and movable clamp members, and including additional structure carrying all of said movable clamp members for simultaneous movement of the movable members relatively toward and away from the fixed members, said additional structure including a bar carrying said movable clamp members, pivoted arms carrying said bar, and a clamp actuator on the frame and operatively connected to said pivoted arms,
   (i) and wherein said cutter means include multiple relatively fixed and movable blades, and including elongated relatively fixed and movable bars to which the blades are individually and removably connected, the movable blades carried by the movable bar and the fixed blades carried by the fixed bar, the blades having different size cutting edges corresponding to different wire insulation sizes.

2. The apparatus of claim 1 including a frame, and wherein said structure includes a carriage mounted on the frame for reciprocation away from and toward said guide.

3. The apparatus of claim 2 wherein said structure has a retracted position in which the cutter means is retracted away from the bare wire end, thereby to allow said selected length of insulation to drop in spaced relation to said bare wire end.

4. The apparatus of claim 1 including retracting means operatively connected with said carriage structure to initially retract the sensor means relatively away from the cutter means prior to subsequent retraction of the carriage structure to said retracted position.

5. The apparatus of claim 2 including a pivoted arm carrying the movable blade bar for pivoting movement.

6. The apparatus of claim 5 including a blade actuator on the carriage structure and operatively connected with said pivoted arm for effecting said pivoted movement.

7. Apparatus as defined in claim 1 wherein the blades associated with the fixed bar are defined by a one-piece blade structure, and the blades associated with the movable bar are defined by a one-piece blade structure.

8. The apparatus of claim 2 wherein one of the fixed and movable clamp members comprise clamp members having elastomeric bodies each having a lengthwise tapering surface of engagement with a selected wire end or ends.

9. The apparatus of claim 4 wherein the retracting means has a direct connection with the sensor means, and a lost motion connection with the carriage structure.

10. The apparatus of claim 9 wherein the retracting means comprises a pneumatic actuator.

11. The apparatus of claim 6 wherein the blade actuator comprises a pneumatic actuator, there being a pneumatic pilot valve associated with the sensor means to bleed pressurized gas in response to wire end displacement of a sensor pad defined by the sensor means, and there being a valve connected with the pilot valve and pneumatic actuator to effect pneumatic pressure activation of the actuator in response to said gas bleed at the pilot valve.

12. The apparatus of claim 1 wherein the clamp actuator comprises a pneumatic actuator, there being a pneumatic pilot valve associated with the sensor means to bleed pressurized gas in response to wire end displacement of a sensor pad defined by the sensor means, and there being a valve connected with the pilot valve and pneumatic actuator to effect pneumatic pressure activation of the actuator in response to said gas bleed at the pilot valve.

13. The apparatus of claim 5 wherein the blades have U-shaped cutting edges sized to cut the wire insulation without cutting the wire core.

14. Wire stripping apparatus for stripping insulation off a wire core, comprising:
(a) a guide forming at least one opening to receive an insulated wire end,
(b) wire end sensor means for sensing a wire end inserted through said opening,
(c) wire end clamping means operable in response to said sensing to clamp said insulated wire inserted through said opening,
(d) cutter means operable in response to said sensing to sever a predetermined length of insulation on said insulated wire end inserted through said opening,
(e) and carriage structure carrying said sensor means and said cutter means to retract same relatively away from said clamp means after said clamp means has clamped said wire end and after said cutter means has severed said insulation, thereby to pull said selected length of insulation off the wire core,
(f) a housing for said apparatus, the housing having a front panel, there being multiple of said guides carried by said front panel and forming different size bores to receive different diameter wires, there being one each of said sensor means, clamping means, and cutter means associated with each of the guides,
(g) said carriage structure carrying all of said sensor means and cutter means to retract them simultaneously relatively away from the clamp means and guides, and
(h) means for adjusting the spacing of each sensor means from its associated clamping means, to enable selection of the length of insulation to be stripped off the wire core.

15. The apparatus of claim 14 wherein the sensor means includes a pilot valve housing and a pilot valve therein for bleeding air pressure when a sensor pad is deflected by a wire end, there being a mount for said pilot valve housing, and said adjusting means including an adjustable friction interfit between the mount and pilot valve housing allowing shifting of the housing relative to the mount.

* * * * *